US012565151B2

(12) United States Patent
Choi et al.

(10) Patent No.: US 12,565,151 B2
(45) Date of Patent: Mar. 3, 2026

(54) VEHICLE STORAGE DEVICE

(71) Applicant: HYUNDAI MOBIS CO., LTD., Seoul (KR)

(72) Inventors: Ik Keun Choi, Yongin-si (KR); Da Som Park, Yongin-si (KR); Kwan Woo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 613 days.

(21) Appl. No.: 17/949,303

(22) Filed: Sep. 21, 2022

(65) Prior Publication Data

US 2023/0415656 A1     Dec. 28, 2023

(30) Foreign Application Priority Data

Jun. 27, 2022     (KR) ........................ 10-2022-0077962

(51) Int. Cl.
B60R 7/04          (2006.01)
B60N 3/00          (2006.01)
          (Continued)

(52) U.S. Cl.
CPC ................ B60R 7/04 (2013.01); B60N 3/001 (2013.01); B60Q 3/225 (2017.02); B60R 5/003 (2013.01);
          (Continued)

(58) Field of Classification Search
CPC ... B60R 7/06; B60R 13/0206; B60R 11/0235; B60R 11/0258; B60R 11/0264;
          (Continued)

(56) References Cited

U.S. PATENT DOCUMENTS 5,472,110 A * 12/1995 Boyd ........................ B25H 3/02
                                                    220/326
5,669,537 A * 9/1997 Saleem ..................... B60R 7/02
                                                    224/42.32
          (Continued)

FOREIGN PATENT DOCUMENTS

CN          102079261 B      7/2012
EP          1 153 796 A1   11/2001
          (Continued)

OTHER PUBLICATIONS

Hinge, Wikipedia, https://en.wikipedia.org/wiki/Hinge, retrieved Oct. 2025.*

(Continued)

*Primary Examiner* — Patricia L Engle
(74) *Attorney, Agent, or Firm* — NSIP Law

(57)          ABSTRACT

A vehicle storage device includes a rail part, disposed on a floor panel in a passenger seat space, configured to extend into the passenger seat space; a first storage part, comprising a lower housing coupled to the rail part and a storage box, wherein the lower housing is configured to move on the floor panel along the rail part in a first direction, the lower housing comprising an opening opened toward a driver seat, and the storage box is configured to be withdrawn toward the driver seat or received in the lower housing by passing through the opening; and a second storage part comprising an upper housing detachably coupled on the lower housing.

16 Claims, 12 Drawing Sheets

(51) Int. Cl.
| | |
|---|---|
| *B60Q 3/225* | (2017.01) |
| *B60R 5/00* | (2006.01) |
| *B60R 11/00* | (2006.01) |

(52) U.S. Cl.
CPC . *B60R 2011/0029* (2013.01); *B60R 2011/007* (2013.01); *B60R 2011/0084* (2013.01); *B60R 2011/0094* (2013.01)

(58) Field of Classification Search
CPC ..... B60R 2011/0005; B60R 2013/0287; B60R 13/02; B60R 7/04; B60R 2011/0084; B60R 5/003; B60R 2011/0029; B60R 2011/007; B60R 2011/0094; B60K 35/10; B60K 35/50; B60K 35/60; B60K 37/00; B60K 2360/141; B60K 2360/771; H03K 17/955; B60Q 3/225; B60Q 3/82; B60N 3/001
USPC ....................................................... 296/24.4
See application file for complete search history.

(56) References Cited

U.S. PATENT DOCUMENTS

| | | | | |
|---|---|---|---|---|
| 6,655,561 | B2 * | 12/2003 | Panhelleux | B60N 2/793 224/281 |
| 6,811,197 | B1 * | 11/2004 | Grabowski | B60R 7/04 180/68.5 |
| 7,152,897 | B2 * | 12/2006 | Bonnes | B60R 7/04 296/35.1 |
| 7,543,874 | B2 * | 6/2009 | Ogura | B60R 7/04 296/37.8 |
| 9,676,339 | B2 * | 6/2017 | Huebner | B60R 5/045 |
| 10,435,082 | B1 * | 10/2019 | Kupina | B60P 1/486 |
| 10,467,577 | B2 * | 11/2019 | James | G06Q 50/40 |
| 10,479,279 | B2 * | 11/2019 | Shin | B60R 5/045 |
| 11,958,440 | B2 * | 4/2024 | Chen | B60R 7/04 |
| 2005/0242604 | A1 * | 11/2005 | Bonnes | B60R 7/04 296/35.1 |
| 2007/0046058 | A1 * | 3/2007 | Busha | B60R 7/04 296/37.8 |
| 2008/0303302 | A1 * | 12/2008 | Sturt | B60R 7/04 296/24.34 |
| 2010/0128493 | A1 * | 5/2010 | Hipshier | B60R 7/04 362/501 |
| 2012/0298678 | A1 | 11/2012 | Hanson | |
| 2019/0084485 | A1 * | 3/2019 | Rivas Franco | B60R 7/02 |
| 2020/0254936 | A1 * | 8/2020 | Razvi | B60R 7/04 |
| 2021/0086699 | A1 * | 3/2021 | Chen | B60R 7/04 |
| 2022/0080871 | A1 * | 3/2022 | Park | B60N 3/002 |
| 2023/0192002 | A1 * | 6/2023 | Boinais | B60R 7/04 296/37.8 |

FOREIGN PATENT DOCUMENTS

| | | | | |
|---|---|---|---|---|
| EP | 3 708 429 | A1 | 9/2020 | |
| FR | 3097824 | A1 * | 1/2021 | B60R 7/04 |
| JP | 2008-24201 | A | 2/2008 | |
| KR | 10-2014-0112859 | A | 9/2014 | |
| KR | 10-1601504 | B1 | 3/2016 | |
| KR | 10-1612065 | B1 | 4/2016 | |
| KR | 10-2019-0091776 | A | 8/2019 | |

OTHER PUBLICATIONS

Extended European search report issued on Jun. 5, 2023, in counterpart European Patent Application No. 22208260.4 (9 pages).
Korean Office Action issued on Jan. 15, 2024, in counterpart Korean Patent Application No. 10-2022-0077962 (6 pages in Korean).
European Office Action Issued on Apr. 14, 2025, in Counterpart European Patent Application No. 22 208 260.4 (6 Pages in English).

* cited by examiner (a)

(b)

VEHICLE STORAGE DEVICE

CROSS-REFERENCE TO RELATED APPLICATION

This application claims the benefit under 35 USC 119(a) of Korean Patent Application No. 10-2022-0077962, filed on Jun. 27, 2022, the entire disclosure of which is incorporated herein by reference for all purposes.

BACKGROUND

1. Field

The following description relates to a vehicle storage device, and more specifically, to a vehicle storage device installed in a passenger seat space of a vehicle to be used as a storage space for storing objects.

2. Discussion of Related Art

Conventional cockpits of hailing/delivery vehicles include a driver seat and a passenger seat like the conventional sedan/van. However, hailing/delivery vehicles using a purpose built vehicle (PBV) do not need a structure for a passenger seat.

Accordingly, there is a need for development of a purpose-based technology for utilizing a space of a passenger seat as a space for driver convenience or for storing baggage after removing the passenger seat of a cockpit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle storage device includes a rail part, disposed on a floor panel in a passenger seat space, configured to extend into the passenger seat space; a first storage part, including a lower housing coupled to the rail part and a storage box, wherein the lower housing is configured to move on the floor panel along the rail part in a first direction, the lower housing including an opening opened toward a driver seat, and the storage box is configured to be withdrawn toward the driver seat or received in the lower housing by passing through the opening; and a second storage part including an upper housing detachably coupled on the lower housing.

The storage box, connected to a guide rail disposed on the lower housing and extended toward the opening in a second direction different from the first direction, is configured to move along the guide rail in the second direction and pass through the opening.

The first direction may be a front-rear direction, and second direction may be a left-right direction.

The vehicle storage device may further include a lighting lamp disposed on an inner surface of the storage box, and a switch disposed on an outer surface of the storage box facing an inner surface of the lower housing. The lighting lamp may be configured to be in a first state when the storage box is received in the lower housing, and the lighting lamp may be configured to be in a second state different from the first state when the storage box is withdrawn from the lower housing.

In the first state, the lighting lamp may be turned off and the switch may be pressed by the inner surface. In the second state, the lighting lamp may be turned on and the switch may be spaced apart from the inner surface to release the switch.

The vehicle storage device may further include magnets disposed at facing positions on an upper surface of the lower housing and a lower surface of the upper housing.

The vehicle storage device may further include an automatic cable winding unit including a retractable cable connected to the lower housing.

The lower housing may include a support hinge-coupled to a lower surface of the lower housing and unfolded downward, and the support may be unfolded to support the lower housing when the lower housing moves toward the passenger seat space.

The upper housing may include an entrance in an upper surface of the upper housing with an upward open structure, and a table, disposed on the upper surface, configured to open or close the entrance.

The vehicle storage device may further include a lighting lamp disposed on an inner surface of the upper housing, and a switch disposed on a portion of the entrance on which the table is disposed. The lighting lamp may be in a first state when the table closes the entrance and in a second state different from the first state when the table opens the entrance.

In the first state, the lighting lamp may be turned off and the switch may be pressed by the table. In the second state, the lighting lamp may be turned on and the switch pressed may be released.

The table may include a body having open two side surfaces, and an auxiliary wing extendable from the table through the two open side surfaces of the body.

The rail part may include a base, including a rail groove, fixed to the floor panel; a fixed rail disposed in the rail groove; and a moving rail movably connected to the fixed rail. The lower housing may be disposed on the moving rail.

The vehicle storage device may further include an actuator, connected to the moving rail, configured to move the moving rail.

The vehicle storage device may further include a pegboard installed on an outer side surface of each of the lower housing and the upper housing.

The lower housing may include a support guide fixed to a lower surface of the lower housing, and the support guide may be configured to move along with the lower housing in the first direction and support the lower housing.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
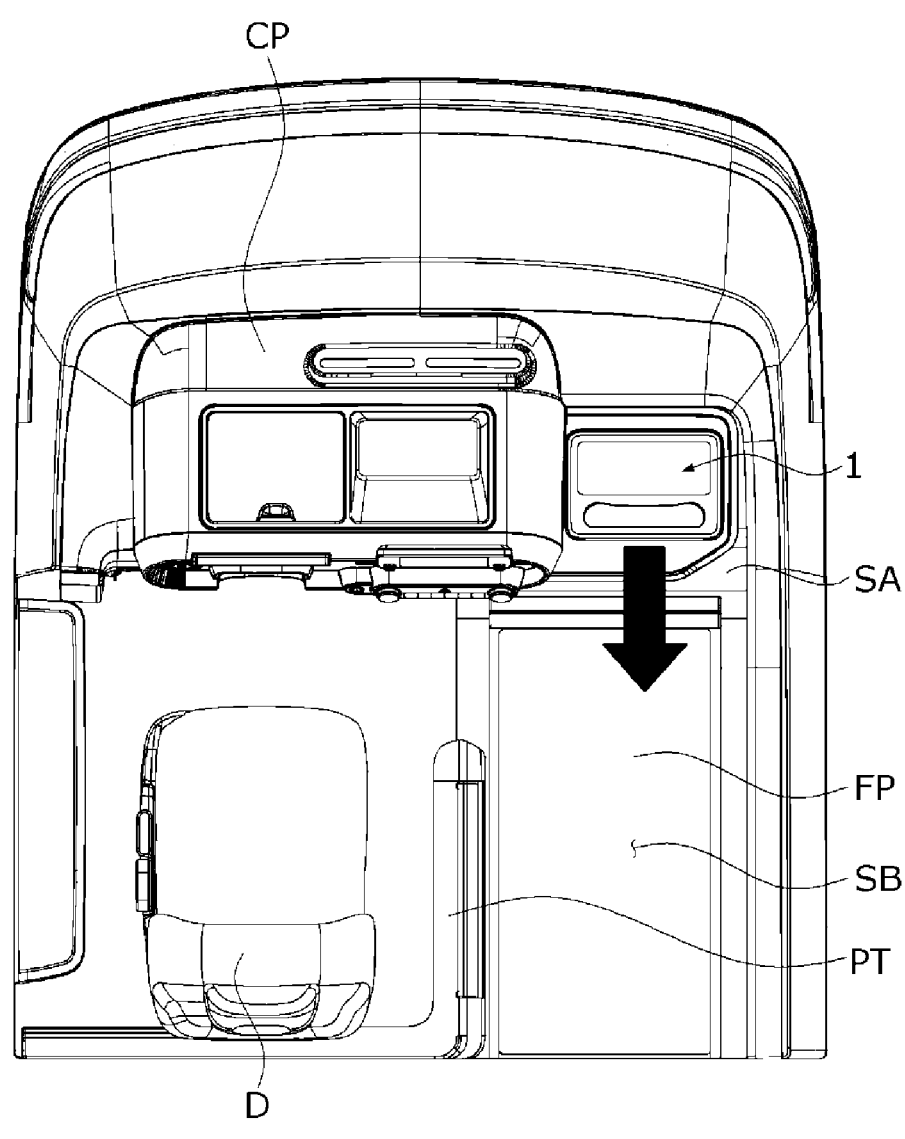
FIG. 1 is a schematic view illustrating a state in which a vehicle storage device according to an embodiment of the present disclosure is installed in a vehicle.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present disclosure. The term "and/or" includes any one or any combination of a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present disclosure. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

Figure 2:
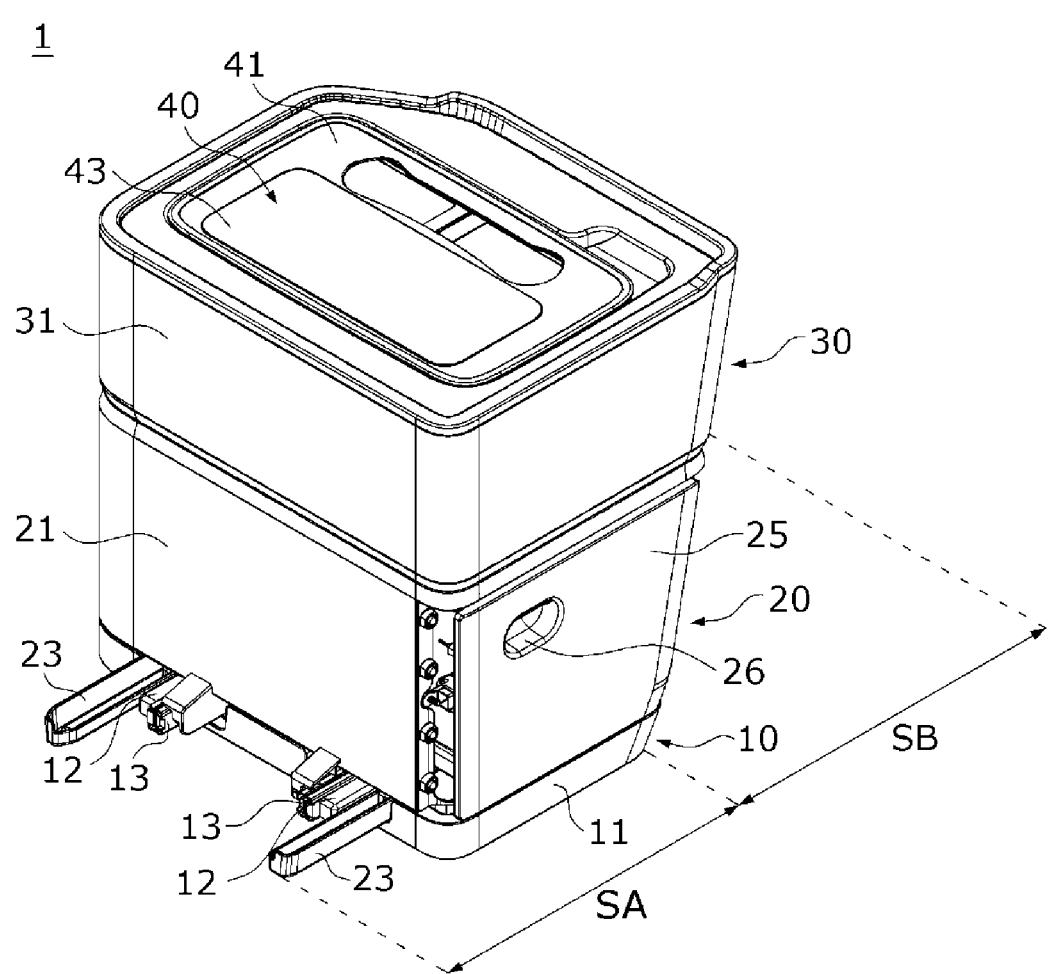
FIG. 2 is a schematic perspective view illustrating the vehicle storage device according to the embodiment of the present disclosure.
Figure 3:
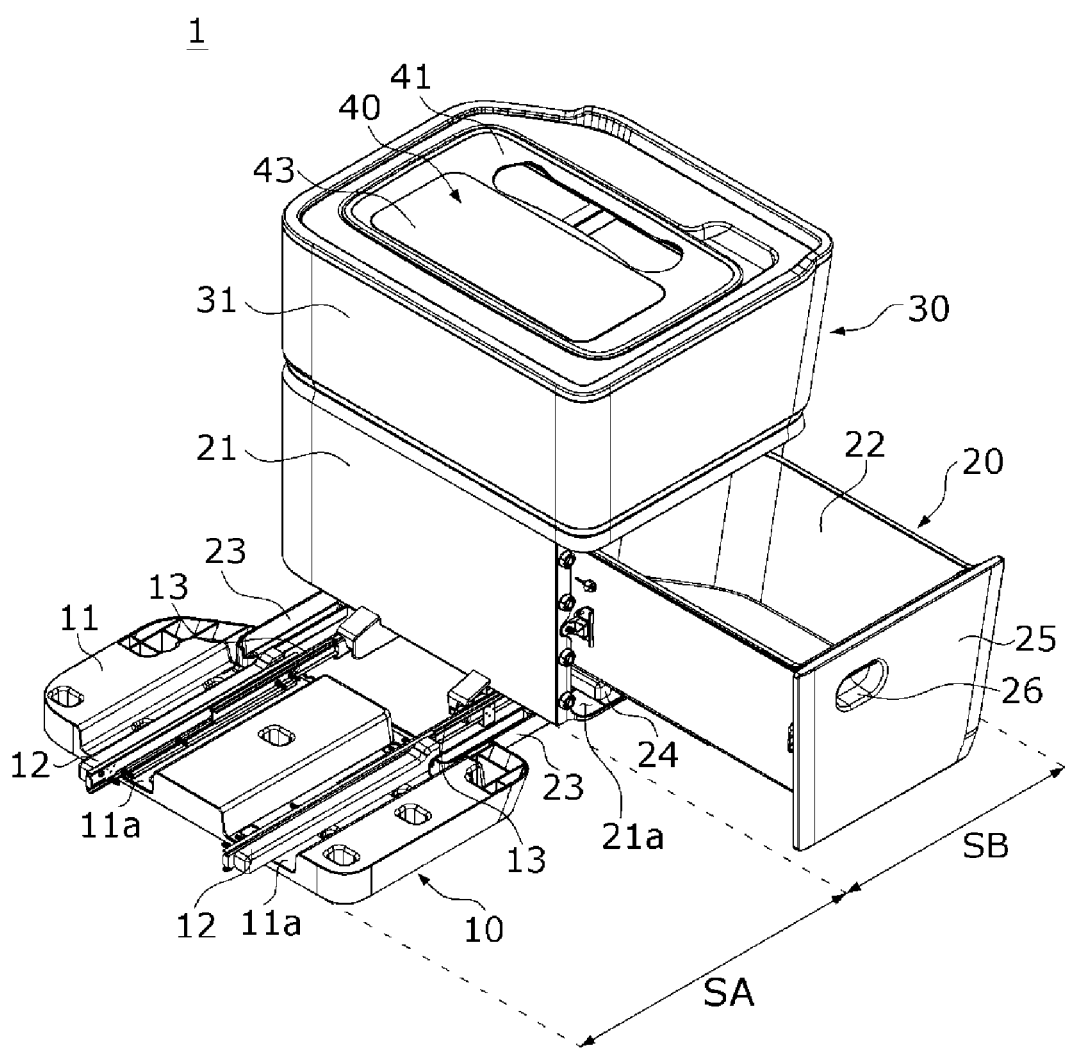
FIG. 3 is a schematic perspective view illustrating a state in which the vehicle storage device of FIG. 2 moves to a passenger seat space and a storage box is withdrawn.
Figure 4:
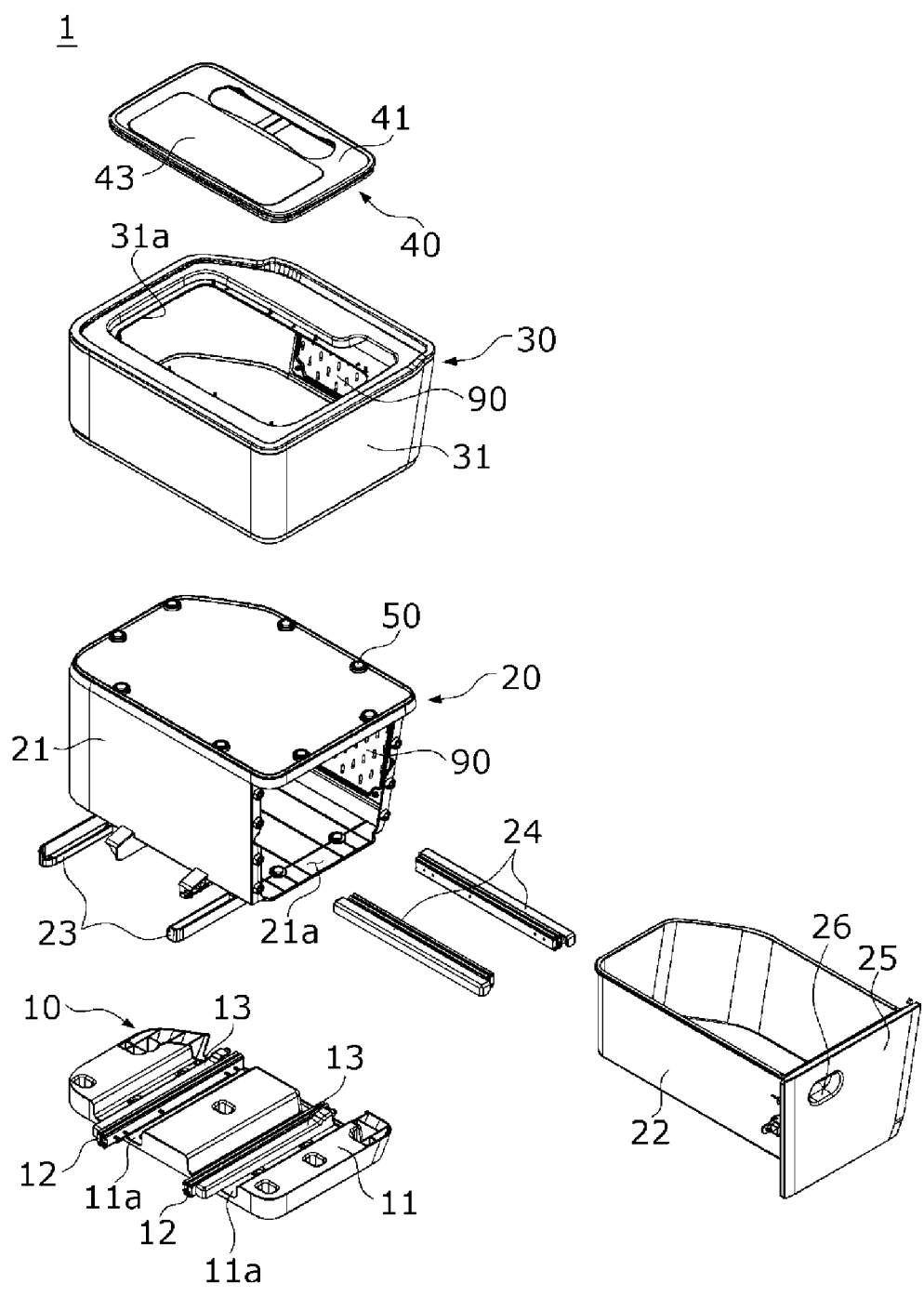
FIG. 4 is an exploded schematic perspective view illustrating the vehicle storage device of FIG. 2.

FIG. 1 is a schematic view illustrating a state in which a vehicle storage device according to an embodiment of the present disclosure is installed in a vehicle, FIG. 2 is a schematic perspective view illustrating the vehicle storage device according to the embodiment of the present disclosure, FIG. 3 is a schematic perspective view illustrating a state in which the vehicle storage device of FIG. 2 moves to a passenger seat space and a storage box is withdrawn, and FIG. 4 is an exploded schematic perspective view illustrating the vehicle storage device of FIG. 2.

Referring to the drawings, a vehicle storage device 1 according to the embodiment of the present disclosure may include a rail part 10, a first storage part 20, and a second storage part 30.

The rail part 10 may be installed on a floor panel FP in a passenger seat space SB from which a passenger seat (not shown) is removed. In the embodiment, the rail part 10 may be disposed with a structure extending from a pass region SA formed by removing a cockpit CP at the passenger seat to the passenger seat space SB.

The rail part 10 may include a base 11 including rail grooves 11a and fixed to the floor panel FP, fixed rail 12 installed in the rail grooves 11a to extend in a front-rear direction, and moving rails 13 movably connected to the fixed rails 12. A lower housing 21, which will be described below, may be installed on the moving rails 13.

The first storage part 20 may be installed to be movable along the rail part 10 in the front-rear direction. In the embodiment, the first storage part 20 may move between the pass region SA and the passenger seat space SB.

The first storage part 20 may include the lower housing 21 installed on the rail part 10 to be movable on the floor panel FP in the front-rear direction and a storage box 22 provided in the lower housing 21.

The lower housing 21 may be provided in substantially a box shape having an inner space, and the moving rails 13 may be connected to a lower surface of the lower housing 21.

The lower housing 21 may include an opening 21*a* formed to open toward a driver seat D in one side surface the lower housing 21. The opening 21*a* may be used as a path through which the storage box 22 is received in the lower housing 21 and the storage box 22 passes and moves.

Figure 9:
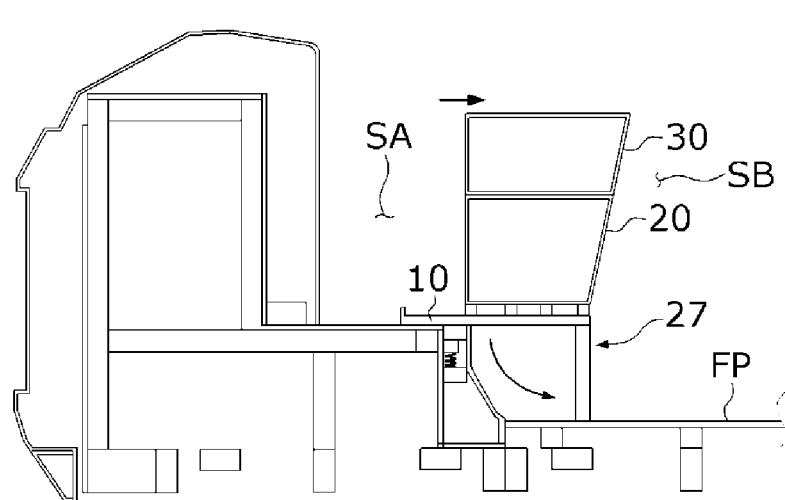
FIG. 9 is a schematic view illustrating a state in which a support is unfolded in a state in which a lower housing is moved.

In the embodiment, the lower housing 21 may include a support 27 which is hinge-coupled to the lower surface of the lower housing 21 and unfolded downward. FIG. 9 schematically shows a state in which the support 27 is unfolded in a state in which the lower housing 21 moves to the passenger seat space SB.

As illustrated in FIG. 9, when the floor panel FP in the passenger seat space SB is not flat and is recessed downward to form a step structure, the support 27 may be provided to be unfolded in the state in which the lower housing 21 moves to the passenger seat space SB so as to support the lower housing 21. Accordingly, the lower housing 21 may be stably supported in the passenger seat space SB.

In addition, the lower housing 21 may include support guides 23 which are fixed to the lower surface of the lower housing 21 and move in the front-rear direction along with the moving rails 13 in the rail grooves 11*a* of the base 11.

The support guides 23 may be provided as a pair of support guides 23 and provided with a structure protruding from the lower surface of the lower housing 21 toward the pass region SA. When the lower housing 21 moves along the moving rails 13 in the front-rear direction, the support guides 23 stably guide a moving direction, support the lower housing 21 to minimize a load of the lower housing 21 applied to the moving rails 13, and thus prevent the rail part 10 from being damaged.

In the embodiment, a pegboard 90 allowing various objects to be hanged thereon may be installed on an outer side surface of the lower housing 21.

Figure 5:
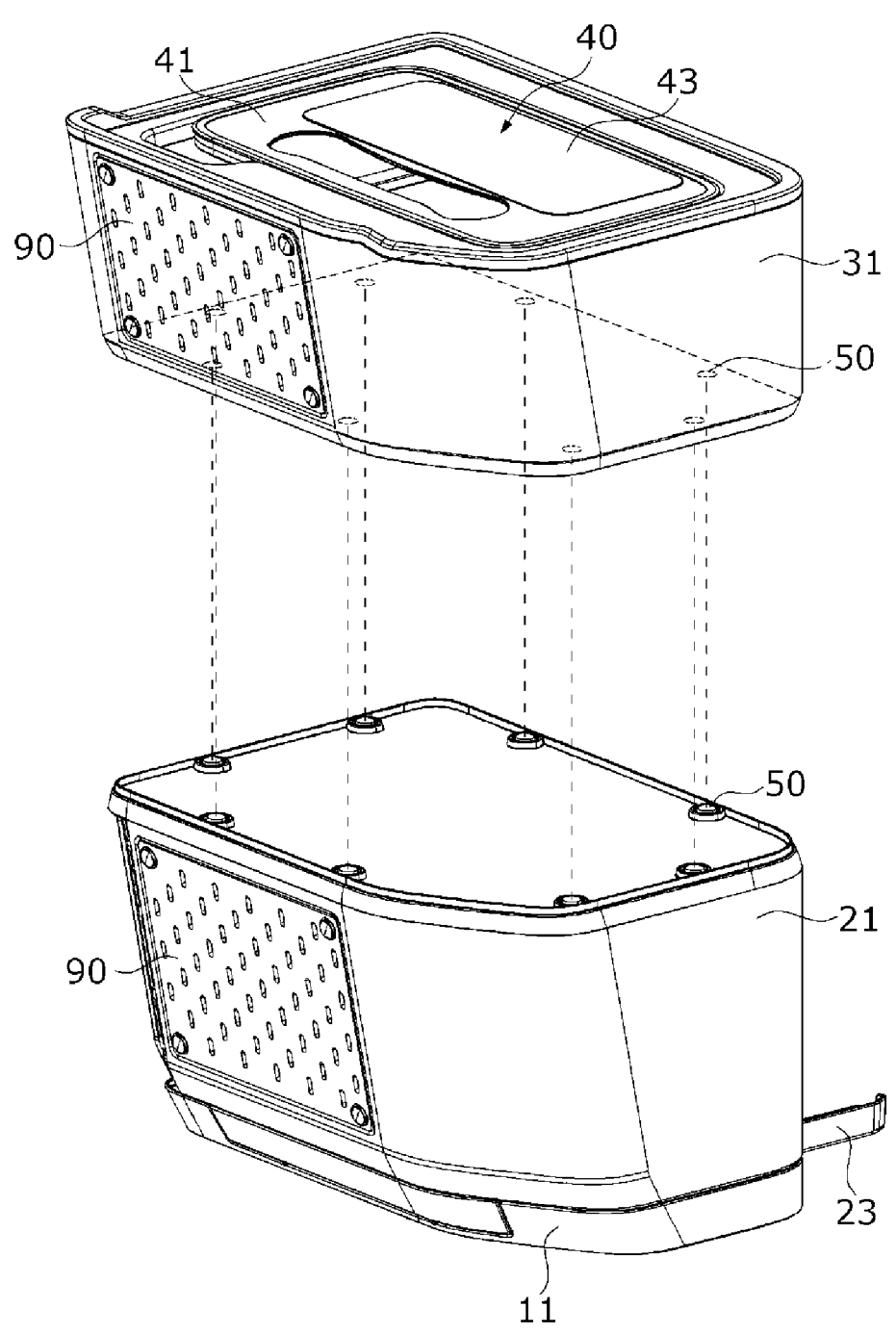
FIG. 5 is a schematic perspective view illustrating magnets interposed between a first storage part and a second storage part.

In addition, as illustrated in FIG. 5, magnets 50 may be provide on an upper surface of the lower housing 21 to install an upper housing 31 of the second storage part 30 which will be described below. The magnets 50 may be disposed along an edge of the upper surface of the lower housing 21.

The storage box 22 may be provided with a structure having an upward open box shape and provided to be withdrawn toward the driver seat D or received in the lower housing 21 by passing through the opening 21*a*.

In the embodiment, the storage box 22 may be connected to the guide rails 24 installed in the lower housing 21 to extend toward the opening 21*a* in a left-right direction and provided to move along the guide rails 24 in the left-right direction and pass through the opening 21*a*. In this case, the left-right direction may be defined as a direction perpendicular to the front-rear direction which is a moving direction of the moving rails 13.

The storage box 22 may be withdrawn toward the driver seat D or received in the lower housing 21 by passing through the opening 21*a* along the guide rails 24. A driver may put objects in the storage box 22 or withdraw and use the stored objects in a state in which the storage box 22 is withdrawn from the lower housing 21.

A cover 25, which covers and closes the opening 21*a* of the lower housing 21 in a state in which the storage box 22 is received in the lower housing 21, may be provided on one side surface of the storage box 22 facing the driver seat D. In addition, a handle 26 that the driver may grasp may be provided on the cover 25.

Figure 6A:
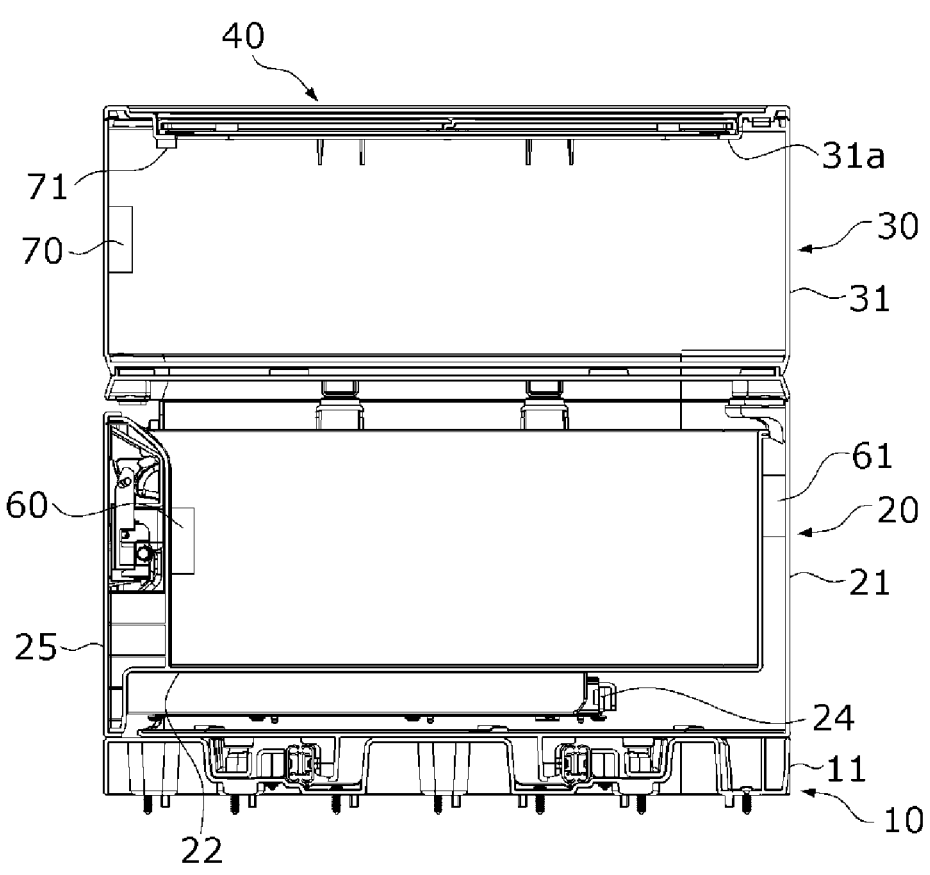
FIGS. 6A and 6B are schematic cross-sectional views illustrating states in which lighting lamps provided in the first storage part and the second storage part are turned OFF and turned ON by switches.
Figure 6B:
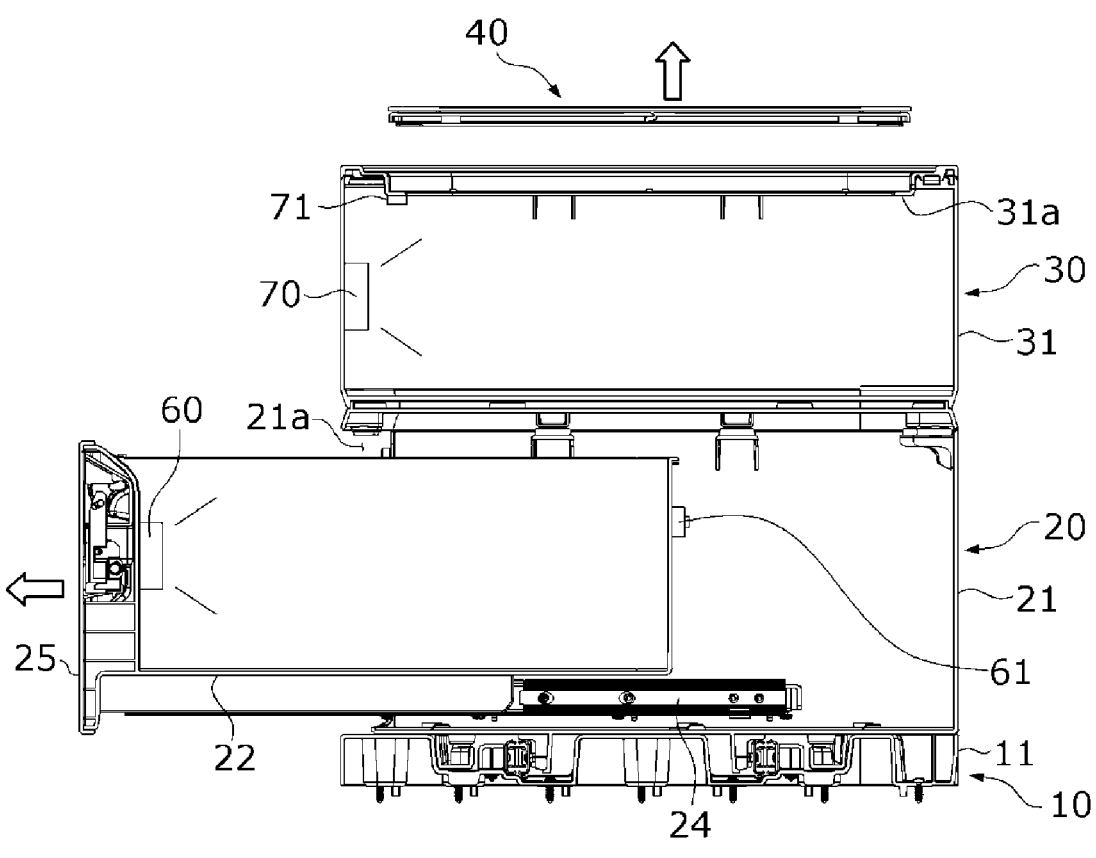

Referring to FIGS. 6A and 6B, in the storage box 22, a lighting lamp 60 may be installed on an inner surface, and a switch 61 may be installed on an outer surface facing an inner surface of the lower housing 21.

In the embodiment, the switch 61 may include a press switch, and the lighting lamp 60 may include a light-emitting diode (LED) which generates light by manipulating the switch 61.

The lighting lamp 60 may be formed to selectively operate according to a pressed state or released state of the switch 61. Specifically, the lighting lamp 60 may be formed to be turned OFF in the pressed state in which the storage box 22 is received in the lower housing 21 and the switch 61 is pressed by the inner surface, and the lighting lamp 60 may be formed to be turned ON in a state in which the storage box 22 is withdrawn from the lower housing 21 and the switch 61 is spaced apart from the inner surface so that the pressed state is released.

Accordingly, when the driver withdraws the storage box 22 to put objects in or take objects out of the storage box 22, the lighting lamp 60 may be automatically turned on to easily check an interior of the storage box 22, and thus convenience can be improved. In addition, the lighting lamp 60 is automatically turned off when the storage box 22 is received in the lower housing 21.

The second storage part 30 may be installed on the first storage part 20.

In the embodiment, the second storage part 30 may include the upper housing 31 detachably installed on the lower housing 21.

The upper housing 31 may include an entrance 31*a* in an upper surface, have an upward open structure to receive objects, and include a table 40 which is disposed on the upper surface and opens or closes the entrance 31*a*.

As illustrated in FIG. 5, magnets 50 may be provided on a lower surface of the upper housing 31. The magnets 50 may be disposed on an edge of the lower surface of the upper housing 31. In this case, the magnets 50 may be disposed at positions facing the magnets 50 provided on the upper surface of the lower housing 21.

In the present embodiment, the magnets 50 are provided on each of the upper surface of the lower housing 21 and the lower surface of the upper housing 31, but the present disclosure is not limited thereto. For example, the magnets 50 may also be provided at any one side of the upper surface of the lower housing 21 and the lower surface of the upper housing 31. In this case, metal members may be provided at the other side at which the magnets 50 are not provided.

As described above, since the magnets 50 are provided at facing positions on the upper surface of the lower housing 21 and the lower surface of the upper housing 31, coupling can be performed by a magnetic force to facilitate installation, and easy separation of the upper housing 31 can also be prevented.

In addition, as necessary, the driver may separate the second storage part 30, use only the first storage part 20, and also install a separate convenience device (for example, a mini refrigerator, a dryer, or a portable terminal) on the first storage part 20.

In the embodiment, the pegboard 90 may be installed on an outer side surface of the upper housing 31.

Referring to FIGS. 6A and 6B, a lighting lamp 70 may be installed in an inner surface of the upper housing 31, and a switch 71 may be installed on a portion in which the table 40 of the entrance 31*a* is disposed.

In the embodiment, the switch 71 may include a press switch, and the lighting lamp 70 may include a light-emitting diode (LED) which generates light by manipulating the switch 71.

The lighting lamp 70 may be formed to selectively operate according to a pressed state or released state of the switch 71. Specifically, the lighting lamp 70 may be formed to be turned OFF in the pressed state in which the switch 71 is pressed by the table 40 when the table 40 closes the entrance 31*a*, and the lighting lamp 70 may be formed to be turned ON in a state in which the table 40 is removed to open the entrance 31*a* and the pressed state of the switch 71 is released.

Accordingly, when the driver detaches the table 40 from the housing 31 in order to put objects in or take objects out of the housing 31, the lighting lamp 70 may be automatically turned on to easily check an interior of the housing 31, and thus convenience can be improved.

The table 40 may be installed on the upper surface of the upper housing 31 and used as a cover which closes the open entrance 31*a*, and in a state in which the table 40 is detached from the upper housing 31, the table 40 may be used as a simple table for the driver.

Figure 7:
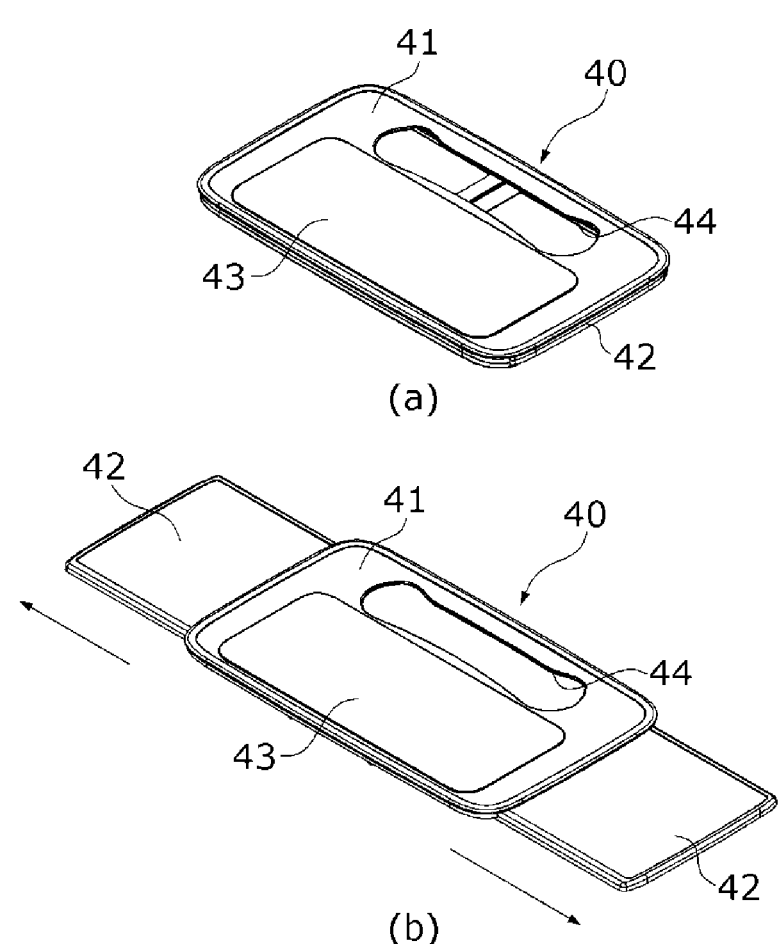
FIGS. 7A and 7B are schematic perspective views illustrating a table and a state in which auxiliary wings are withdrawn from the table.

FIG. 7 is a set of schematic views illustrating the table. As illustrated in FIG. 7, the table 40 may include a body 41 having two open side surfaces and auxiliary wings 42 withdrawn to the outside through the two open side surfaces of the body 41.

A rubber pad 43 for anti-slip may be provided on an upper surface of the body 41, and a fixing hole 44 capable of fixing a beverage cup or the like may be formed in the upper surface of the body 41.

The auxiliary wings 42 may extend outward from the body 41 to increase a size of the table 40. In the embodiment, the auxiliary wings 42 may be formed to be rotated toward a lower portion of the body 41 and fixed after withdrawn to the outside of the body 41. Accordingly, each of the auxiliary wings 42 may have a structure having substantially a "T" shape connected to the body 41 and may be inserted into a partition PT at one side of the driver seat D to fix the table 40.

When the driver puts objects into or uses objects received in the first storage part 20 and/or the second storage part 30, the driver may easily approach the first storage part 20 and/or second storage part 30 by moving the first storage part 20 positioned in the pass region SA to the passenger seat space SB using the rail parts 10.

In addition, the passenger seat space SB may be used as a space in which baggage is loaded by moving the first storage part 20 to the pass region SA along the rail part 10. In addition, the driver may also use the passenger seat space SB as a space for other convenience.

Figure 8:
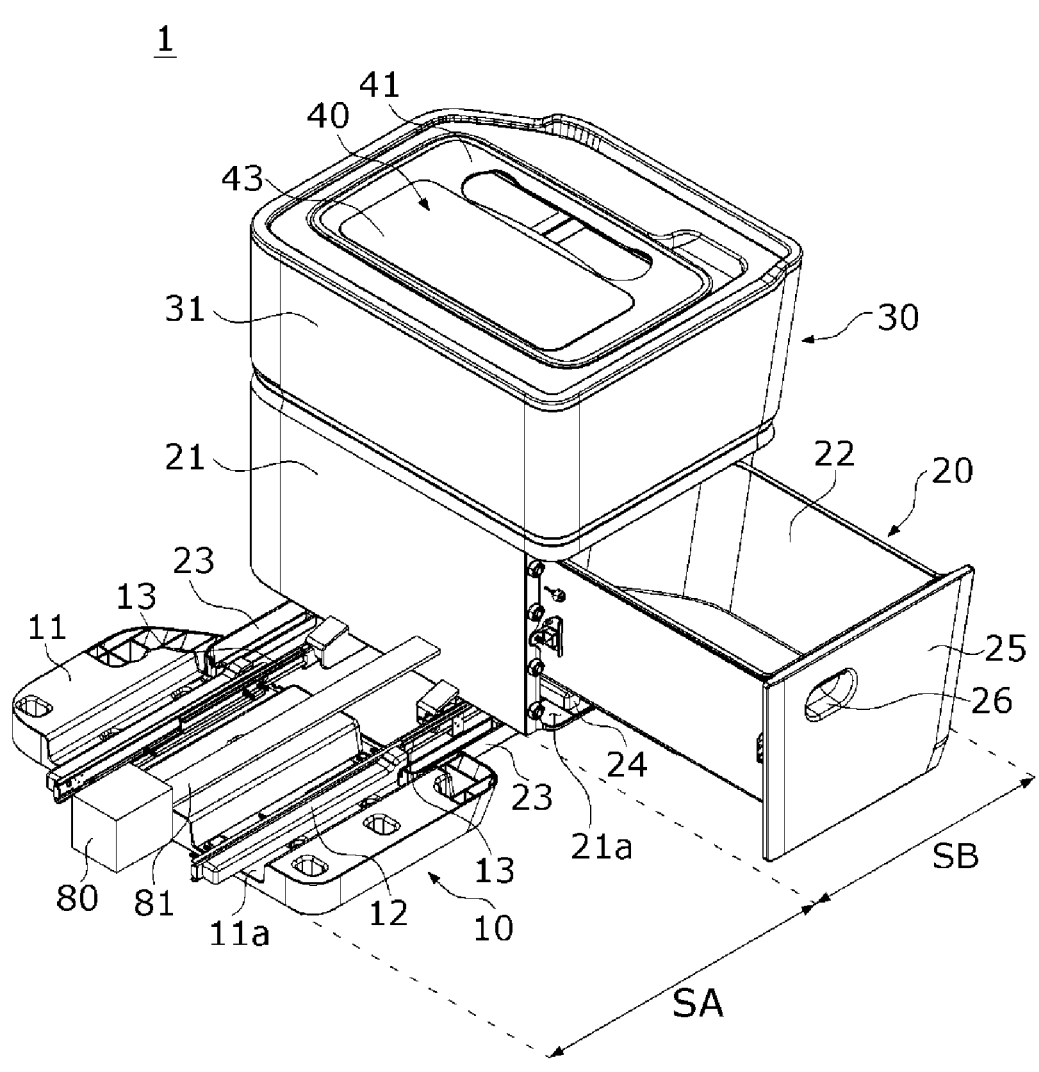
FIG. 8 is a schematic perspective view illustrating the vehicle storage device including an automatic cable winding unit.

Referring to FIG. 8, the vehicle storage device 1 according to the embodiment of the present disclosure may further include an automatic cable winding unit 80.

In the embodiment, the automatic cable winding unit 80 may be installed on the base 11 of the rail part 10.

The automatic cable winding unit 80 may include a cable 81 elastically withdrawn and automatically wound and introduced by an internal elastic member (not shown) and may be connected to the lower housing 21 through the cable 81.

In the embodiment, an example of the elastic member may be an elastic spring wound in a coil shape.

When the lower housing 21 is moved to the passenger seat space SB along the rail part 10 by the driver, the cable 81 may be withdrawn in a state in which tension of the elastic member is applied to the cable 81. In addition, when the lower housing 21 is moved to the pass region SA along the rail part 10, the cable 81 is automatically wound to pull the lower housing 21, and then, the lower housing 21 automatically moves to the pass region SA. Accordingly, cumbersomeness of the driver in pushing the lower housing 21 into an end of the pass region SA may be omitted.

In the present embodiment, an example of the automatic cable winding unit 80 installed on the base 11 is described, but the present disclosure is not limited thereto. For example, the automatic cable winding unit 80 may also be installed on the floor panel FP of the pass region SA.

Figure 10:
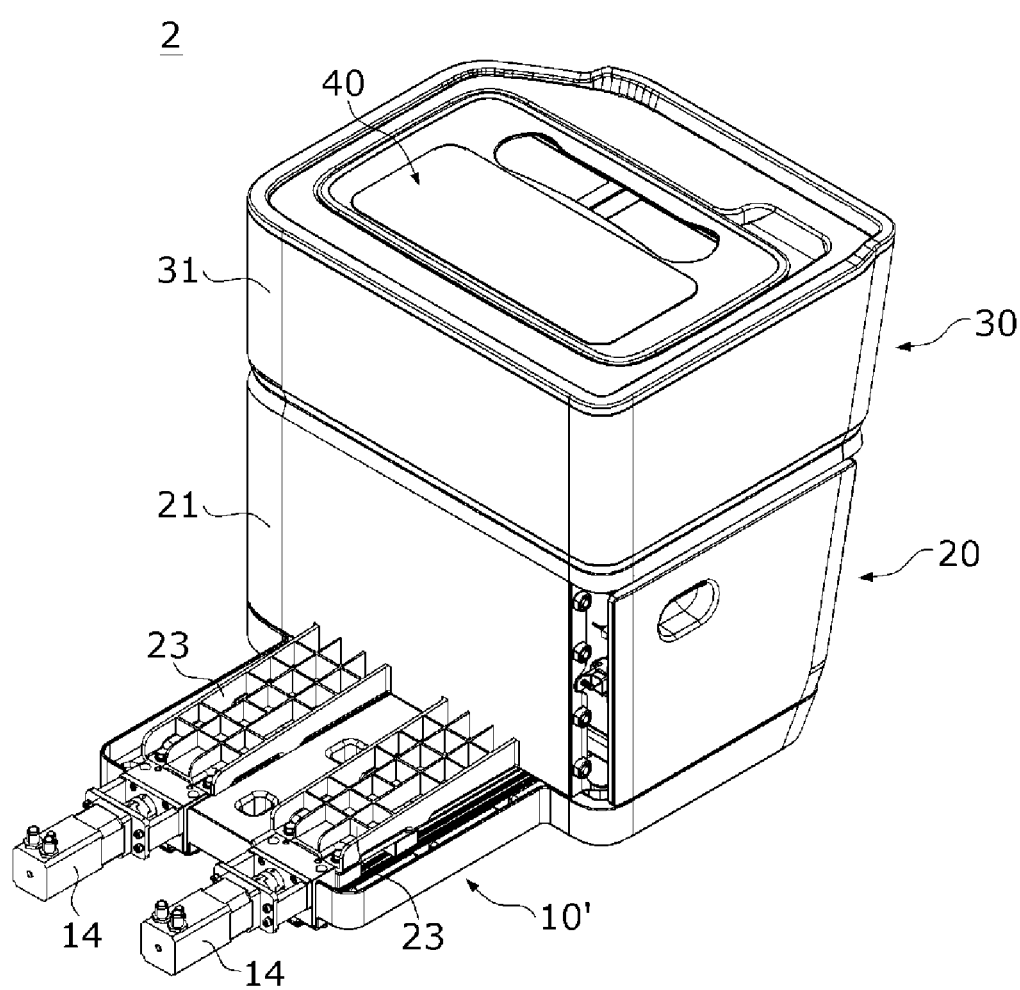
FIG. 10 is a schematic perspective view illustrating a vehicle storage device according to another embodiment of the present disclosure.
Figure 11:
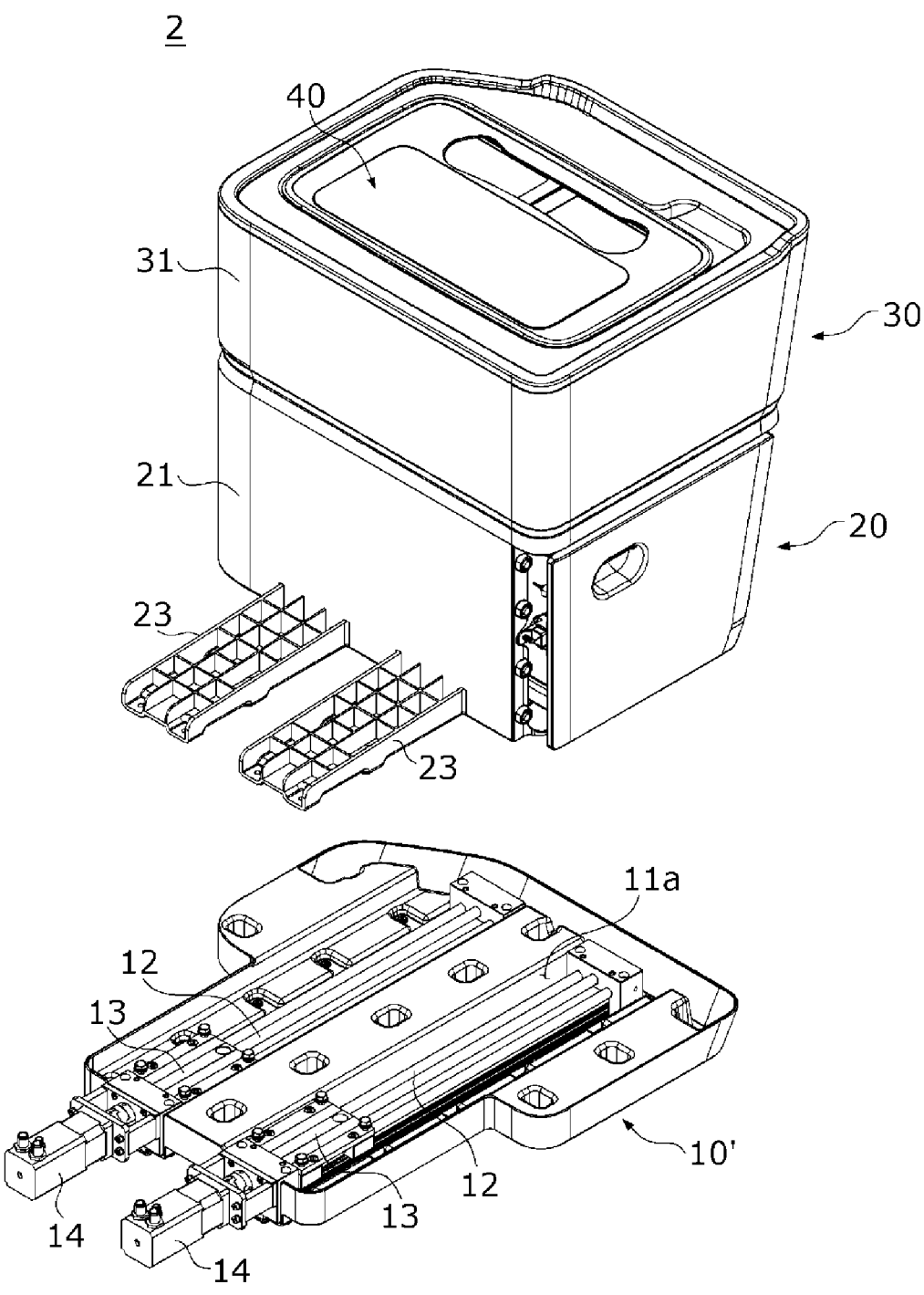
FIG. 11 is a schematic perspective view illustrating a state in which a rail part and a first storage part are separated in the vehicle storage device of FIG. 10.

FIGS. 10 and 11 schematically show a vehicle storage device 2 according to another embodiment of the present disclosure.

The vehicle storage device 2 according to the embodiment illustrated in FIGS. 10 and 11 has substantially the same basic structure as the vehicle storage device 1 illustrated in FIG. 2. However, there is a difference in that a rail part 10' further includes actuators 14. Hereinafter, the difference will be mainly described.

Referring to the drawings, the vehicle storage device 2 according to the embodiment of the present disclosure may include the rail part 10', a first storage part 20, and a second storage part 30.

The rail part 10' may include a base 11 including rail grooves 11*a* and fixed to a floor panel FP, fixed rails 12 installed in the rail grooves 11*a* in a front-rear direction, moving rails 13 movably connected to the fixed rails 12, and the actuators 14 connected to the moving rails 13 to move the moving rails 13.

A lower housing 21 of the first storage part 20 may be installed on the moving rails 13. In this case, support guides 23 of the lower housing 21 may be disposed on the moving rails 13 and fixed to the moving rails 13 in a screw-coupling manner.

The actuators 14 may be provided as a pair of the actuators 14 and formed to be disposed at an end of the base 11 and connected to the moving rails 13.

According to operation of the actuators 14, the moving rails 13 move along the fixed rails 12 in the front-rear direction, and thus, the lower housing 21 fixed to the moving rails 13 also moves in the front-rear direction.

Accordingly, a driver may manipulate a switch to electrically drive the rail part 10' so as to move the first storage part 20 or the first storage part 20 and the second storage part 30 to a passenger seat space SB or pass region SA.

As described above, according to the embodiments of the present disclosure, since the storage device is installed with a movable structure in the passenger seat space in a purpose built vehicle in which a structure of the passenger seat is not required, there are advantages of maximizing driver conveniency and utilization of a space.

In addition, since a storage space is divided into the first storage part in a lower portion and the second storage part in an upper portion, storage target objects can be divided and stored in consideration of properties, purposes of use, and the like, and thus there are advantages of improving the efficiency of storage as well as preventing damage to the objects.

In addition, in the case of the first storage part, since the storage box can be provided to be withdrawn while sliding toward the driver, there is an advantage that the driver can conveniently approach the storage box even in a state in which the driver seats on a driver seat.

In addition, since the rail part is formed to be electrically driven through the actuators, or the lower housing is connected to the cable of the automatic cable winding unit, the lower housing is formed to be automatically moved by a pulling force of the cable when the lower housing is moved, and thus there is an advantage of improving operational convenience.

According to embodiments of the present disclosure, a vehicle storage device installed in a portion of a passenger seat to improve driver convenience can be provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle storage device comprising:
a rail part, disposed on a floor panel in a passenger seat space, configured to extend into the passenger seat space;
a first storage part, comprising a lower housing coupled to the rail part and a storage box, wherein the lower housing is configured to move on the floor panel along the rail part in a first direction, the lower housing comprising an opening opened toward a driver seat, and the storage box is configured to be withdrawn toward the driver seat or received in the lower housing by passing through the opening; and
a second storage part comprising an upper housing detachably coupled on the lower housing,
wherein:
the lower housing comprises a support hinge-coupled to a lower surface of the lower housing and unfolded downward, and
the support is unfolded to support the lower housing when the lower housing moves toward the passenger seat space.

2. The vehicle storage device of claim 1, wherein the storage box, connected to a guide rail disposed on the lower housing and extended toward the opening in a second direction different from the first direction, is configured to move along the guide rail in the second direction and pass through the opening.

3. The vehicle storage device of claim 1, wherein the first direction is a front-rear direction, and the second direction is a left-right direction.

4. The vehicle storage device of claim 1, further comprising:
a lighting lamp disposed on an inner surface of the storage box; and a switch disposed on an outer surface of the storage box facing an inner surface of the lower housing, wherein the lighting lamp is configured to be in a first state when the storage box is received in the lower housing, and the lighting lamp is configured to be in a second state different from the first state when the storage box is withdrawn from the lower housing.

5. The vehicle storage device of claim 4, wherein
in the first state, the lighting lamp is turned off and the switch is pressed by the inner surface, and
in the second state, the lighting lamp is turned on and the switch is spaced apart from the inner surface to release the switch.

6. The vehicle storage device of claim 1, further comprising:
magnets disposed at facing positions on an upper surface of the lower housing and a lower surface of the upper housing.

7. The vehicle storage device of claim 1, further comprising an automatic cable winding unit comprising a retractable cable connected to the lower housing.

8. The vehicle storage device of claim 1, wherein the upper housing comprises:
an entrance in an upper surface of the upper housing with an upward open structure; and
a table, disposed on the upper surface, configured to open or close the entrance.

9. The vehicle storage device of claim 8, further comprising:
a lighting lamp disposed on an inner surface of the upper housing; and
a switch disposed on a portion of the entrance on which the table is disposed,
wherein the lighting lamp is in a first state when the table closes the entrance, and in a second state different from the first state when the table opens the entrance.

10. The vehicle storage device of claim 9, wherein
in the first state, the lighting lamp is turned off and the switch is pressed by the table, and
in the second state, the lighting lamp is turned on and the switch pressed is released.

11. The vehicle storage device of claim 8, wherein the table comprises:
a body having open two side surfaces; and
an auxiliary wing extendable from the table through the two open side surfaces of the body.

12. The vehicle storage device of claim 1, wherein the rail part comprises:
a base, comprising a rail groove, fixed to the floor panel;
a fixed rail disposed in the rail groove; and
a moving rail movably connected to the fixed rail, and
wherein the lower housing is disposed on the moving rail.

13. The vehicle storage device of claim 12, further comprising an actuator, connected to the moving rail, configured to move the moving rail.

14. The vehicle storage device of claim 1, further comprising a pegboard installed on an outer side surface of each of the lower housing and the upper housing.

15. The vehicle storage device of claim 1, wherein:
the lower housing comprises a support guide fixed to a lower surface of the lower housing; and
the support guide is configured to move along with the lower housing in the first direction and support the lower housing.

16. A vehicle storage device configured to be installed in a passenger seat space of a vehicle, the device comprising:

a rail assembly fixed to a floor panel in the passenger seat
space and extending in a front-rear direction;

a first storage unit comprising:

a lower housing coupled to the rail assembly and
configured to move in the front-rear direction along
the rail assembly, the lower housing comprising an
opening oriented toward a driver seat; and a storage box received within the lower housing and
coupled to a guide rail extending in a left-right
direction, the storage box configured to slide in the
left-right direction through the opening toward or
away from the driver seat; and a second storage unit comprising an upper housing
detachably mounted on top of the lower housing and
comprising an openable entrance in an upper surface,
wherein:

the lower housing comprises a support hinge coupled to a
lower surface of the lower housing and unfolded down-
ward, and the support is unfolded to support the lower housing when
the lower housing moves toward the passenger seat
space.

\* \* \* \* \*